United States Patent [19]

Kato

[11] Patent Number: 5,702,655
[45] Date of Patent: Dec. 30, 1997

[54] METHOD FOR CHARGING POWDERY HEAT INSULATOR INTO A THERMALLY INSULATED, DOUBLE-SHELLED TANK

[75] Inventor: Toshiro Kato, Hyogo-ken, Japan

[73] Assignee: L'Air Liquide, Societe Anonyme pour L'Etude et L'Exploitation des Procedes Georges Claude, Paris Cedex, France

[21] Appl. No.: 458,750

[22] Filed: Jun. 2, 1995

[30] Foreign Application Priority Data

Jun. 2, 1994 [JP] Japan .................................. 6-142202

[51] Int. Cl.⁶ .............................. B65D 88/02; F17C 13/00
[52] U.S. Cl. .................... 264/85; 264/101; 264/344; 220/421; 406/197; 34/412; 34/507
[58] Field of Search .......................... 264/85, 101, 102, 264/344; 428/69; 220/421, 422; 62/45.1, 268, DIG. 13

[56] References Cited

U.S. PATENT DOCUMENTS

| 4,667,390 | 5/1987 | Acharya et al. | 220/421 |
| 5,066,437 | 11/1991 | Barito et al. | 264/102 |
| 5,316,816 | 5/1994 | Sextl et al. | 264/102 |
| 5,473,901 | 12/1995 | Roseen | 264/102 |

*Primary Examiner*—Catherine Timm
*Attorney, Agent, or Firm*—Burns, Doane, Swecker & Mathis, LLP

[57] ABSTRACT

Provided is a method for charging a powdery heat insulator into a thermally insulated, double-shelled tank between its inner vessel and outer vessel. The method comprises causing a powdery heat insulator to flow together with water into a space between the inner vessel and outer vessel of a thermally insulated, double-shelled tank, discharging the water in said space, and then drying the powdery heat insulator. The pressure in the space is then also reduced. The drying of the powdery heat insulator can be carried out by heating either the inner vessel or outer vessel, or both of these vessels, or by inert gas flow, such as nitrogen gas.

9 Claims, 4 Drawing Sheets

METHOD FOR CHARGING POWDERY HEAT INSULATOR INTO A THERMALLY INSULATED, DOUBLE-SHELLED TANK

BACKGROUND OF THE INVENTION

The present invention relates to a method for charging a powdery heat insulator into a thermally insulated, double-shelled tank. In particular, the present invention relates to a method for charging a powdery heat insulator into a space between the inner vessel and outer vessel of a thermally insulated, double-shelled tank for storage and transportation of liquefied gases.

FIG. 2 and FIG. 3 of the Drawing show a conventional thermally insulated, double-shelled tank. In the figures, there is shown an inner vessel 1 for storing, for example, liquid oxygen; an outer vessel 2 surrounding this inner vessel 1; a powdery heat insulator such as Pearlite (trademark) charged in a space 4 between the inner vessel 1 and outer vessel 2; a supply port 5 and a take-out port 6 for liquid oxygen-to the inner vessel 1; opening 7 provided on the top portion of said outer vessel 2; a lid 8 for each of said openings; stiffening rings 9 shaped in the letter L in the cross section, which are provided on the inner peripheral surface of said outer vessel 2, with the rings being alienated from one another in the axial direction; and supports 10 inserted between the lower surface of the outer periphery of said inner vessel 1 and the lower surface of the inner periphery of said outer vessel 2, respectively.

When a powdery heat insulator 3 is charged into such a space of a conventional thermally insulated, double-shelled tank, as illustrated, for instance, in Japanese Patent Application Laid-Open No. 53,771/1985 and in FIG. 4. of the Drawing, an exhaust port 12 equipped with a filter 11 is provided at one end of said space 4, a powdery heat insulator feeder 14 is connected to an opening 7 of said outer vessel 2 by way of a hose 13, and a powdery heat insulator 3 is charged into the space 4 by means of air from a blower 15.

In another method of the prior art, as illustrated in Japanese Patent Application Laid-open No. 256,999/1990 and in FIG. 5 of the Drawing, a vacuum suction valve 17 equipped with a filter 16 is communicated with the space 4, and a powdery heat insulator is caused to flow together with nitrogen gas into the space 4 which has been thus made vacuous.

In conventional thermally insulated, double-shelled tanks which generally have a tendency for the space between its inner and outer vessel to become narrower, however, it is very difficult for the aforementioned methods of the prior art to charge into said space 4 a powdery heat insulator 3 uniformly and at a density necessary for obtaining a sufficient heat insulating property. The powdery heat insulator 3 accumulates, for instance, at the stiffening rings 9 placed in the space 4 for reinforcing the outer vessel 2, and as a result, some voids are created in the vicinity thereof.

During transportation of the tank, the powdery heat insulator in the lower region of the inner vessel of the tank can become compressed due to vibration so that its density is increased, and hence the powdery heat insulator becomes settled as illustrated in FIGS. 6 and 7. The density of the powdery heat insulator in the upper region of the inner vessel is correspondingly decreased, thereby exposing the upper surface of the inner vessel.

As a result, the heat insulating properties of the tank are diminished, and a danger exists that radiant heat from the outer vessel 2 reaches the inner vessel 1. The evaporation of gas can increase due to a temperature rise in the inner vessel 1 and the internal pressure of the inner vessel 1 can accordingly rise to abnormal levels. It is therefore necessary to release the evaporated gas to the atmosphere in such instances. The loss in time and economics is too large to justify routinely carrying out the relief of the evaporated gas. Furthermore, in the case where the deep low temperature liquefied gas stored in the tank is combustible, relief of such gas to the atmosphere is a problem from a safety point of view.

When the powdery heat insulator 3 becomes settled, in order to avoid the aforementioned problems, a procedure must be carried out which comprises immediately opening the lid 8 covering the heat insulator openings 7 provided at various places on the top portion of the outer vessel and supplementing the powdery heat insulator 3 through said opening 7, and reducing the pressure in the space 4 again. Since this procedure is carried out after it is returned to a manufacturing factory of the thermally insulated, double-shelled tank, a large loss in time and economies is needed for taking this countermeasure. This procedure must also be followed every time settlement occurs. The present invention is intended to eliminate the aforementioned drawbacks and provide an improved method for charging powdery heat insulator into a thermally insulated tank.

SUMMARY OF THE INVENTION

Provided by the present invention is a method for charging a powdery heat insulator into a thermally insulated, double-shelled tank which comprises the step of introducing a mixture comprised of powdery heat insulator and water into a space between the inner vessel and outer vessel of a thermally insulated, double-shelled tank; discharging the water in said space from the bottom portion of said outer vessel; drying the powdery heat insulator in the space; and reducing the pressure in the space.

The step of drying the powdery heat insulator in the space between the inner and outer vessels invokes removing the remaining moisture from the powdery heat insulator and is preferably accomplished by passing a high-temperature (heated) gas through the inner vessel to heat the inner vessel, thereby evaporating any water contained in the powdery heat insulator. The evaporated water moisture can then be removed by suction. In another embodiment, the drying step is preferably accomplished by heating the outer vessel, instead of heating the inner vessel or in addition to heating the inner vessel, thereby effecting evaporation of the water in the powdery heat insulator. The evaporated water is then removed by suction. The powdery heat insulator can also be dried by passing an inert gas such as nitrogen gas through the powdery heat insulator, in place of heating the inner vessel or outer vessel or in addition to the heating of these vessels, thereby expelling the water in the powdery heat insulator via entrainment with the nitrogen gas.

1—inner vessel; 2—outer vessel; 3—powdery heat insulator; 4—space; 5—supply port; 6—take-out port; 7—openings; 8—lid; 9—stiffening rings; 10—supports; 11—filter; 12—exhaust poet; 13—hose; 14—heat insulator feeder; 15—blower; 16—filter; 17—vacuum suction valve; 18—water mix; 19—water tank; 20—filter; 21—drain pipe.

DETAILED DESCRIPTION OF THE PREFERRED EMBODIMENTS

Figure 1:
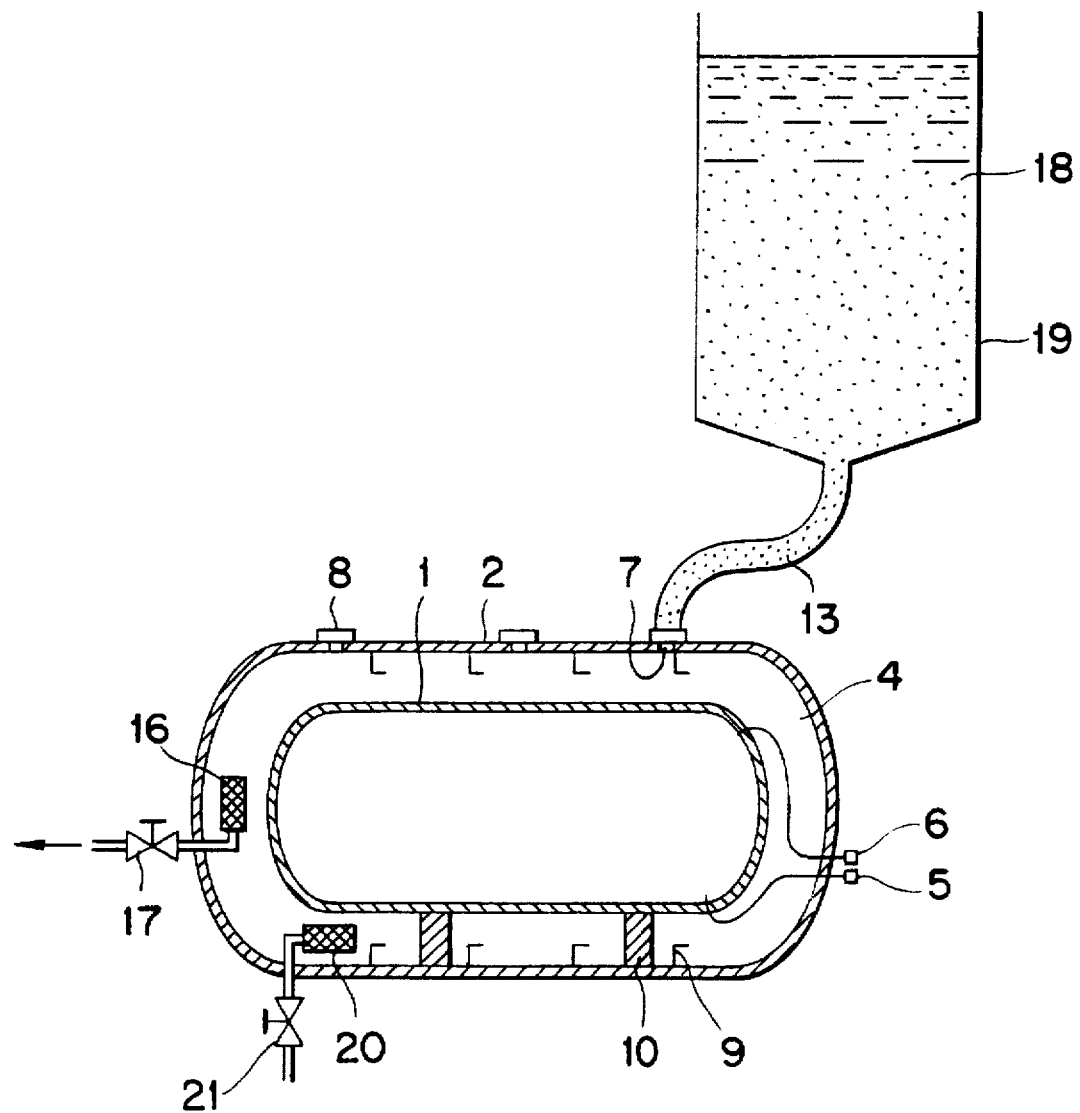
FIG. 1 illustrates a method for charging a powdery heat insulator into a thermally insulated, double-shelled tank, according to the present invention.
Figure 2:
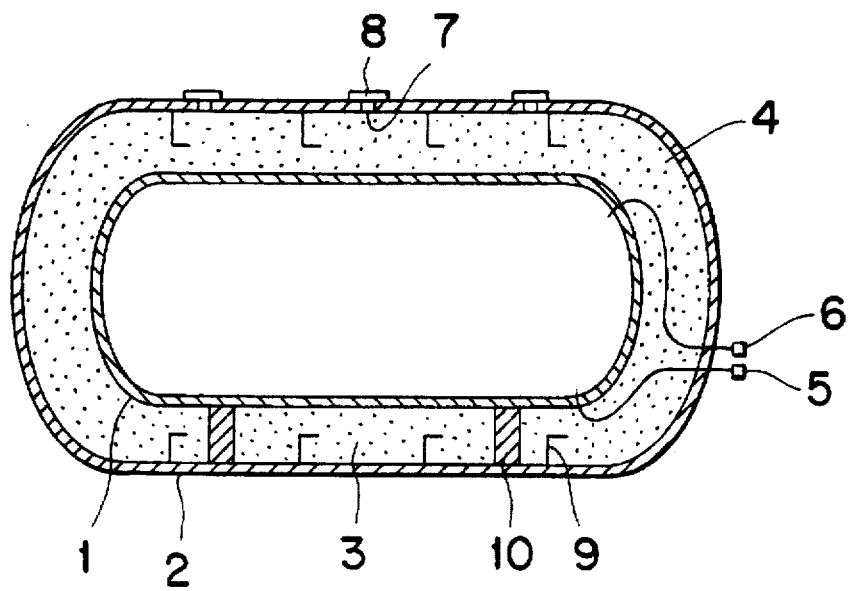
FIG. 2 is a longitudinal sectional front view of a thermally insulated, double-shelled tank of the prior art.
Figure 3:
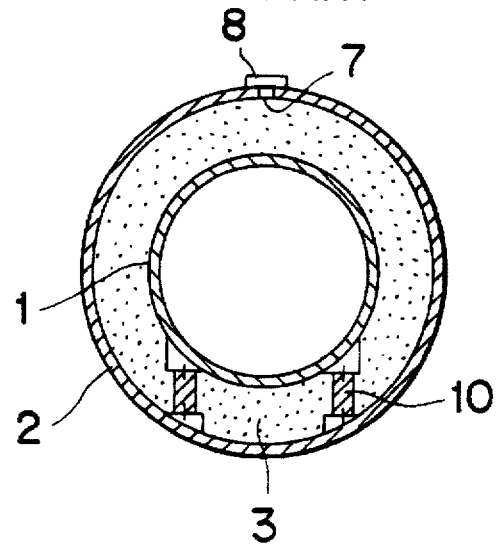
FIG. 3 is a longitudinal sectional, side view of a thermally insulated, double-shelled tank of the prior art.
Figure 4:
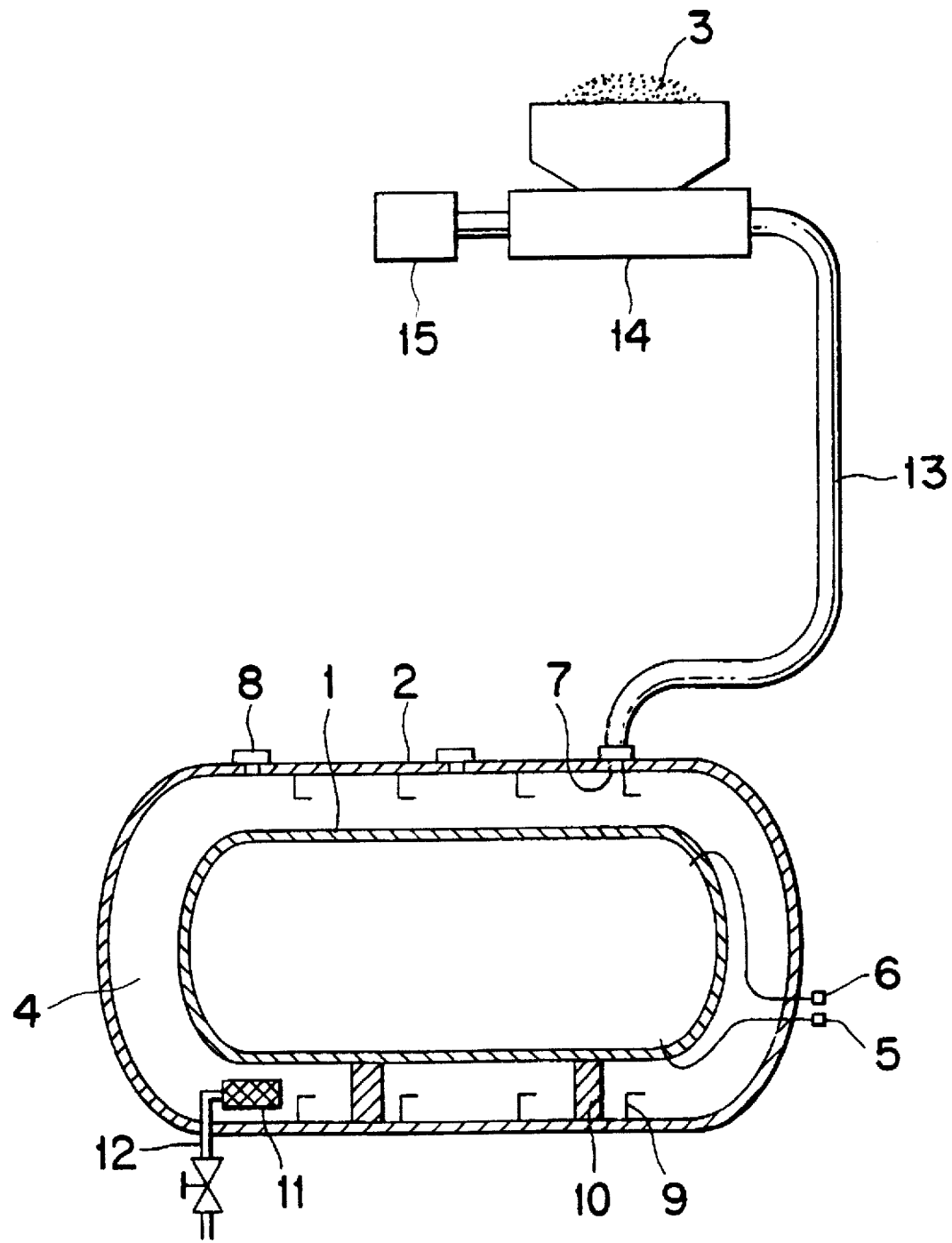
FIG. 4 depicts a method for charging a powdery heat insulator into a thermally insulated, double-shelled tank by use of a blower, according to the prior art.
Figure 5:
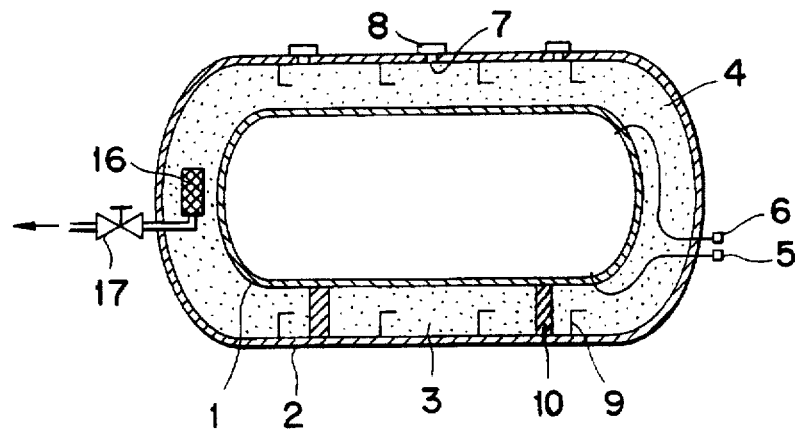
FIG. 5 depicts a method for charging a powdery heat insulator into a thermally insulated, double-shelled tank by use of vacuum suction, according to the prior art.
Figure 6:
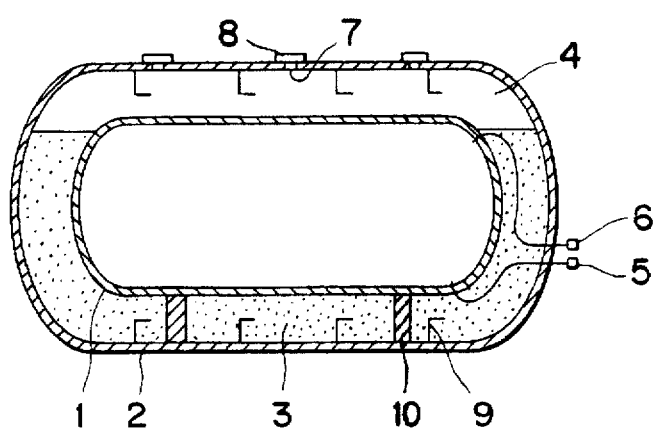
FIG. 6 is a longitudinal sectional front view of a thermally insulated, double-shelled tank of the prior art.
Figure 7:
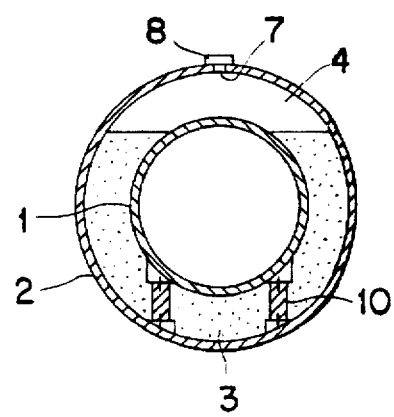
FIG. 7 is a longitudinal sectional side view of a thermally insulated, double-shelled tank of the prior art.

Preferred embodiments of the present invention will be described in reference to the Drawing. In the present invention, as shown in FIG. 1, water mix 18, which is prepared by mixing a powdery heat insulator 3 with water, is charged to a water tank 19. The lower end of this water tank 19 communicates with the opening 7 of the said outer vessel 2 by means of a hose 13, and the water mix 18 is caused to flow into the said space 4.

The water in the water mix 18 which has flowed into the space 4 is removed from the lower portion of the outer vessel 2 through a drain pipe 21 equipped with a filter 20. When the powdery heat insulator 3 has been sufficiently charged into the space 4 due to the flowing of the water mix 18 and the removal of water, the hose 13 can then be removed from opening 7 on the top portion of the outer vessel 2 and lid 8 is again attached.

In order to dry the powdery heat insulator 3 of the remaining moisture, a heated gas (such as high-temperature air or high-temperature nitrogen gas), for example, heated to a temperature of about 200° C., can be blown in from either the supply port or take-out port 5, 6 for liquid oxygen, which are connected to the inner vessel 1, and taken out of the other port, thereby generally heating the inner vessel 1.

The outer vessel 2 can also be heated, for example, by means of a heating apparatus, e.g. such as "a burner". The outer vessel 2 is alternately heated by being placed in a semicylindrical chamber made of heat insulating fabric and blasting hot air therethrough.

After the powdery heat insulator 3 is dried by heating said tank, vacuum suction is started by way of a vacuum suction valve 17 equipped with a filter 16, with the lid 8 attached to the opening 7 on the top portion of the outer vessel of the tank being removed and nitrogen gas free of water being passed through said opening 7, thereby further drying the powdery heat insulator 3. After the opening 7 is shut by the lid 8 again, vacuum suction is effected. The procedure of passing the nitrogen gas through the space is preferably repeated until the powdery heat insulator 3 is completely dry. Said lid 8 is finally fixed to the opening 7 by welding and the inside of the tank is completely reduced in pressure. Thus, the thermally insulated, double-shelled tank is formed.

Regarding the heating of said inner vessel and outer vessel, heating may be carried out on either of them. The heating of the powdery heat insulator by nitrogen gas may, also be carried out either with or without the heating of said inner and outer vessels.

In utilizing the method of the present invention for charging a powdery heat insulator into a thermally insulated, double-shelled tank, at least the following benefits will be realized due to the use of a water mix to charge the powdery heat insulator 3 into space 4.

(1) In the prior art, it takes a few days for charging the powdery heat insulator because the powdery heat insulator is light, and hence, it is hard for the powder to compactly fill the lower or corner portions of the space. According to the present invention, however, it is possible to charge a powdery heat insulator into the lower and corner portions of the space compactly and in a short period of time.

(2) Since the charging density of the powdery heat insulator can be satisfactorily obtained utilizing the present invention, there is no need to supplement the powdery heat insulator, which may be required upon the settlement of the powdery heat insulator due to the use of prior art methods.

In the prior art, the charging density of a powdery heat insulator is 55–60 kg/m$^3$ in the case of charging the powdery heat insulator without effecting vacuum suction, and 90–100 kg/m$^3$ in the case of charging the powdery heat insulator while effecting vacuum suction. According to the method of the present invention, on the other hand, it is possible to make sure the charging density is 120 kg/m$^3$.

(3) The heat insulating property of the tank is improved because the powdery heat insulator is charged at a sufficient density which is stable.

(4) It is also possible to maintain the stable performance of the tank for a long period of time.

(5) The performance of the tanks are uniform, and not uneven.

(6) Although it is required that the powdery heat insulator charged in the prior art is dried before the charging, prior drying is not necessary in the present invention and hence, the maintenance of the powdery heat insulator is made easier.

(7) The working environment is improved because powdered dust from the powdery heat insulator is not a problem.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method for charging a powdery heat insulator into a double-shelled tank having an inner vessel and an outer vessel to obtain a thermally insulated, double-shelled tank, which comprises the steps of:

introducing a mixture comprised of powdery heat insulator and water into a space between the inner vessel and outer vessel of the double-shelled tank;

draining the water from said space; and drying the powdery heat insulator in the space to remove water remaining in the space after the step of draining and thereby forming the thermally insulated, double-shelled tank.

2. The method for charging a powdery heat insulator into a double-shelled tank as claimed in claim 1, wherein the water is drained from the space through the bottom portion of the outer vessel.

3. The method for charging a powdery heat insulator into a double-shelled tank as claimed in claim 1, wherein the pressure in the space is reduced.

4. The method for charging a powdery heat insulator into a double-shelled tank as claimed in claim 1, wherein the step of drying comprises causing a high-temperature gas to flow through the inner vessel to heat the inner vessel, thereby evaporating the water remaining in the space, and removing the evaporated water.

5. The method of claim 4, wherein the evaporated water is removed by vacuum suction.

6. The method for charging a powdery heat insulator into a double-shelled tank as claimed in claim 1, wherein the step of drying comprises heating the outer vessel from the outside, thereby evaporating the water remaining in the space, and removing the evaporated water to leave the powdery heat insulator.

7. The method of claim 6, wherein the evaporated water is removed by vacuum suction.

8. The method for charging a powdery heat insulator into a double-shelled tank as claimed in claim 1, in which the step of drying comprises causing nitrogen gas to flow into the space, thereby-expelling water from the space by entrainment with the nitrogen gas.

9. The method for charging a powdery heat insulator into a double-shelled tank as claimed in claim 3, wherein the water is drained from the space through the bottom portion of the outer vessel.

* * * * *